United States Patent [19]
Laspina et al.

[11] Patent Number: 5,627,561
[45] Date of Patent: May 6, 1997

[54] ELECTROPHORETIC DISPLAY PANEL WITH SELECTIVE CHARACTER ADDRESSABILITY

[75] Inventors: Christopher A. Laspina, Syosset; Edward G. Lewit, Roslyn Heights, both of N.Y.

[73] Assignee: Copytele, Inc., Huntington Station, N.Y.

[21] Appl. No.: 630,555

[22] Filed: Apr. 10, 1996

Related U.S. Application Data

[63] Continuation of Ser. No. 346,838, Nov. 30, 1994, abandoned, which is a continuation of Ser. No. 118,515, Sep. 9, 1993, abandoned.

[51] Int. Cl.[6] ........................................ G09G 3/34
[52] U.S. Cl. .............................. 345/107; 359/296
[58] Field of Search ........................... 345/107; 359/294, 359/295, 296, 297

[56] References Cited

U.S. PATENT DOCUMENTS

| | | |
|---|---|---|
| 4,045,327 | 8/1977 | Noma et al. . |
| 4,448,491 | 5/1984 | Okubo . |
| 4,522,472 | 6/1985 | Liebert et al. . |
| 4,655,897 | 4/1987 | DiSanto et al. . |
| 4,742,345 | 5/1988 | DiSanto et al. . |
| 4,772,820 | 9/1988 | DiSanto et al. . |
| 4,947,157 | 8/1990 | DiSanto et al. ............... 359/296 |
| 5,066,946 | 11/1991 | DiSanto et al. . |
| 5,177,476 | 1/1993 | DiSanto et al. ............... 345/107 |
| 5,223,115 | 6/1993 | DiSanto et al. ............... 345/107 |
| 5,276,438 | 1/1994 | DiSanto et al. ............... 345/107 |

FOREIGN PATENT DOCUMENTS 92015982  9/1992  WIPO ............................. 345/107

OTHER PUBLICATIONS

"Electronic Circuit Discrete and Integrated", 2nd edition, Schilling et al, pp. 38–43, 1979.

Primary Examiner—Regina D. Liang
Attorney, Agent, or Firm—Plevy & Associates

[57] ABSTRACT

An electrophoretic display having a plurality of individual characters which are individually addressable for writing and erasing. The anode of the display has a plurality of character blocks which correspond to the character positions of the display. The character blocks are interconnected by a series of character column and row control lines which are insulated from each other. Each character block is connected to one row line and one column line, respectively, by a resistor and a diode which are arranged in parallel. A further resistor is connected in series with the diode. An individual character block is erased by applying a negative voltage to the specific column line and row line which cross at the desired character block.

16 Claims, 5 Drawing Sheets

| V COL. 2 | V ROW 2 | V COL. 1 | V ROW 1 | V BLOCK (1,1) | V BLOCK (1,2) | V BLOCK (2,1) | V BLOCK (2,2) |
|---|---|---|---|---|---|---|---|
| +V | +V | +V | +V | +V | +V | +V | +V |
| +V | +V | +V | −V | +V | +V | +V | +V |
| +V | +V | −V | +V | +V | +V | +V | +V |
| +V | +V | −V | −V | −V | +V | +V | +V |

FIG. 4

ELECTROPHORETIC DISPLAY PANEL WITH SELECTIVE CHARACTER ADDRESSABILITY

This is a continuation of application Ser. No. 08/346,838, now abandoned filed on Nov. 30, 1994, entitled Electrophoretic Display Panel with Selective Character Addressability, which is a continuation of prior application Ser. No. 08/118,515, filed on Sep. 9, 1993, now abandoned.

BACKGROUND OF THE INVENTION

This invention relates to electrophoretic display devices in general and, more particularly, to an electrophoretic display apparatus which employs means for selectively erasing and rewriting individual characters on the display panel thereof.

Electrophoretic displays (EPIDS) are now well known. A variety of display types and features are taught in several patents issued in the names of the inventors herein, Frank J. DiSanto and Denis A. Krusos and assigned to the assignee herein, Copytele, Inc. of Huntington Station, N.Y. For example, U.S. Pat. Nos. 4,655,897 and 4,732,830, each entitled ELECTROPHORETIC DISPLAY PANELS AND ASSOCIATED METHODS describe the basic operation and construction of an electrophoretic display. U.S. Pat. No. 4,742,345, entitled ELECTROPHORETIC DISPLAY PANELS AND METHODS THEREFOR, describes a display having improved alignment and contrast. Many other patents regarding such displays are also assigned to Copytele, Inc.

The display panels shown in the above-mentioned patents operate upon the same basic principle, viz., if a suspension of electrically charged pigment particles in a dielectric fluid is subjected to an applied electrostatic field, the pigment particles will migrate through the fluid in response to the electrostatic field. Given a substantially homogeneous suspension of particles having a pigment color different from that of the dielectric fluid, if the applied electrostatic field is localized it will cause a visually observable localized pigment particle migration. The localized pigment particle migration results either in a localized area of concentration or rarefaction of particles depending upon the polarity and direction of the electrostatic field and the charge on the pigment particles.

The electrophoretic display apparatus taught in the foregoing U.S. Patents are "triode-type" displays having a plurality of independent, parallel, cathode row conductor elements or "lines" deposited in the horizontal on one surface of a glass viewing screen. A layer of insulating photoresist material deposited over the cathode elements and photoetched down to the cathode elements to yield a plurality of insulator strips positioned at right angles to the cathode elements, forms the substrate for a plurality of independent, parallel column or grid conductor elements or "lines" running in the vertical direction. A glass cap member forms a fluid-tight seal with the viewing window along the cap's peripheral edge for containing the fluid suspension and also acts as a substrate for an anode plate deposited on the interior flat surface of the cap. When the cap is in place, the anode surface is in spaced parallel relation to both the cathode elements and the grid elements. Given a specific particulate suspension, the sign of the electrostatic charge which will attract and repel the pigment particles will be known. The cathode element voltage, the anode voltage, and the grid element voltage can then be ascertained such that when a particular voltage is applied to the cathode and another voltage is applied to the grid, the area proximate their intersection will assume a net charge sufficient to attract or repel pigment particles in suspension in the dielectric fluid. Since numerous cathode and grid lines are employed, there are numerous discrete intersection points which can be controlled by varying the voltage on the cathode and grid elements to cause localized visible regions of pigment concentration and rarefaction. Essentially then, the operating voltages on both cathode and grid must be able to assume at least two states corresponding to a logical one and a logical zero. Logical one for the cathode may either correspond to attraction or repulsion of pigment. Typically, the cathode and grid voltages are selected such that only when both are a logical one at a particular intersection point, will a sufficient electrostatic field be present at the intersection relative to the anode to cause the writing of a visual bit of information on the display through migration of pigment particles. The bit may be erased, e.g., upon a reversal of polarity and a logical zero-zero state occurring at the intersection coordinated with an erase voltage gradient between anode and cathode. In this manner, digitized data can be displayed on the electrophoretic display.

Accordingly, in order to erase the image in an electrophoretic display of this type, the cathode is biased positively with respect to the anode, i.e. to create an electric field of opposite polarity. In the aforementioned type of electrophoretic display device, the anode is a unitary planar structure to which one voltage is applied in the write mode and a different voltage is applied in the erase mode. All lines of the displayed image are erased simultaneously upon application of the erase voltage anode, and all lines of the display must be rewritten to form the next image frame. The next frame may often have character lines for image portions which are the same as the previous frame, which results in the redundancy of rewriting numerous identical lines from frame to frame.

U.S. Pat. No. 5,066,946, issued on Nov. 19, 1991, to Frank J. DiSanto and Denis A. Krusos, entitled "Electrophoretic Display Panel With Selective Line Erasure", which is also owned by the assignee of the present application, discloses an electrophoretic display panel which provides for selective line erasure. The electrophoretic display apparatus of this patent has grid and cathode conductors arranged as an X-Y matrix spaced from an anode with an electrophoretic dispersion in between them. Pigment particles in the dispersion become charged at selected intersection areas of the X-Y matrix and migrate towards the anode to form a display image thereon by biasing the cathode negatively with respect to the, anode, and the display image is erased by oppositely biasing the cathode and anode. The anode is formed by a plurality of parallel line segments corresponding to image lines of the display. Each anode line segment is a longitudinal rectangular conductor having a height which corresponds to the height of a text character line. Line control means are also provided and have a plurality of switch elements for individually switching the potential applied to an anode line segment to be erased from a first potential for writing to a second, different potential for erasing the line segment, while all the other line segments that are not to be erased are maintained at the first potential.

Although single line erasure is preferable to erasure of all the lines in the display, it is not an optimally efficient manner when it is desired to change only select image characters in the display.

Accordingly, it is an object of the present invention to provide a method and an electrophoretic display which overcomes the aforementioned disadvantages of the prior art devices. In particular, the object of the invention is to provide an electrophoretic display in which individual characters of the display can be selectively erased and rewritten without disturbing the other image characters which remain the same from one frame to the next.

SUMMARY OF THE INVENTION

Pursuant to this object, and others which will become apparent hereafter, one aspect of the present invention resides in an electrophoretic display having a segmented anode, with each respective segment of the anode being arranged in a corresponding character position to define a character block. A plurality of parallel cathode control lines are arranged in a given direction while a plurality of parallel grid control lines are arranged perpendicular to the cathode control lines. The anode is arranged above the cathode and grid control lines so as to have a space therebetween which accommodates an electrophoretic dispersion including pigment particles suspended in a fluid. The character blocks are interconnected by the horizontal row control lines and the vertical column control lines through a resistor in parallel with a series connected diode and resistor.

In a write mode all of the anode character blocks are provided with a positive voltage by making all of the column lines and row lines have a positive voltage. Voltages applied to the grid and cathode lines are controlled so that the pigment particles are urged toward the anode in the write mode. In order to erase a single anode character block the column line and row line corresponding to the desired character block are both provided with a negative voltage. This negative voltage from both the row and column causes the block to be erased by forcing the pigment particles toward the cathode and grid lines. Only the selected block is erased since all the remaining blocks have at least one row or column with the positive write voltage.

BRIEF DESCRIPTION OF THE DRAWINGS

FIG. 4 is a table indicating character block voltage; and

DETAILED DESCRIPTION OF THE PREFERRED EMBODIMENT

Figure 1:
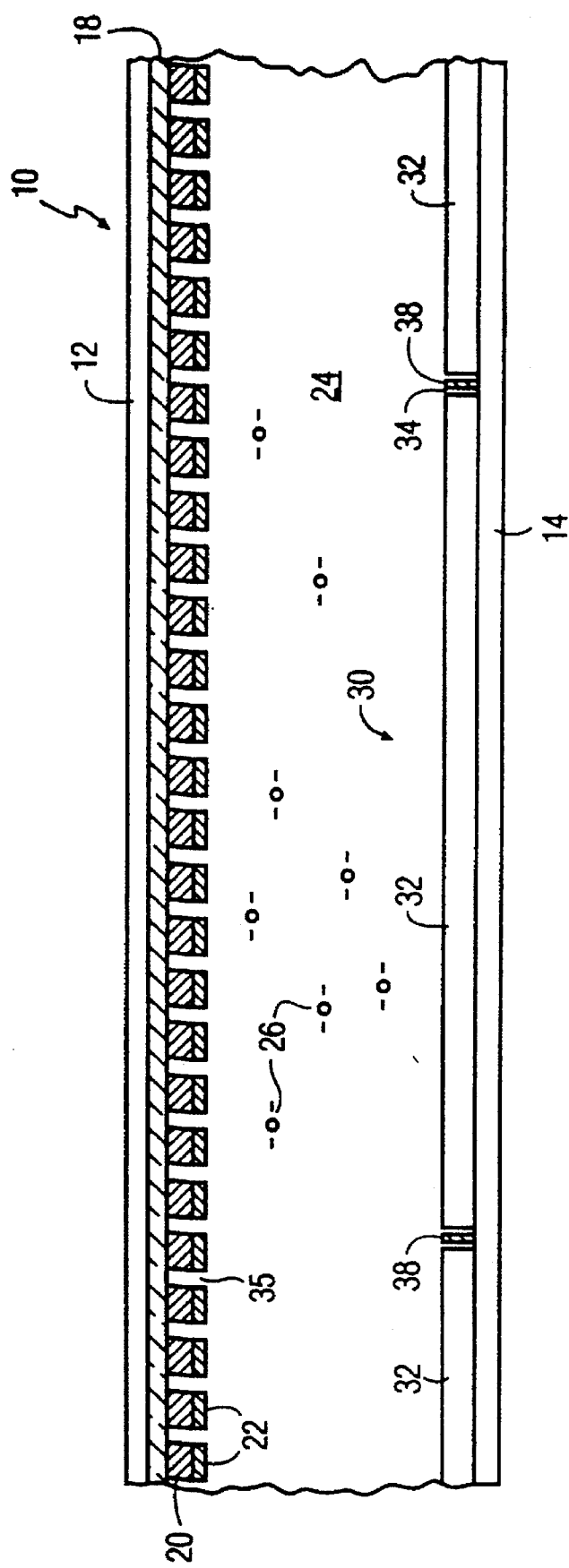
FIG. 1 is a cross sectional view of an electrophoretic display panel employing a character block anode structure constructed in accordance with a first embodiment of the present invention.

An electrophoretic display device 10 employing the segmented anode configuration of the present invention may be seen, for example, by reference to FIG. 1. It will, however, be understood by those of ordinary skill in the art that the description of EPID 10 is for illustrative purposes only and that any EPID configuration may employ the novel segmented anode and associated erase control circuitry to be herein described.

As seen in FIG. 1, the illustrative electrophoretic display device 10 includes two separated substrates 12 and 14, at least one of which is transparent by way of being a material such as glass or plastic. Substrate 12, which is preferably coated with an extremely thin layer of indium tin oxide (ITO), acts as a port through which a viewer of the display may discern image information set forth thereon. The ITO layer is extremely thin, on the order of 100 to 300 angstroms, and hence is truly transparent. Utilizing a technique such as that described in U.S. Pat. No. 4,732,830, the disclosure of which is incorporated herein by reference, a pattern of horizontal lines is etched on the surface of the ITO layer to form a plurality of rows of cathode conductors 18.

Disposed upon the group of cathode conductors 18 are a series of insulator members 20. The insulator members are formed from a photoresist layer such as a phenolic resin impregnated with photoactive material which layer is deposited over the cathode line structure. The photoresist layer is treated to selectively remove photoresist where a plurality of vertical lines are deposited upon the insulator members 20 to form a plurality of column conductors or grid electrodes 22 perpendicular to the cathode conductors 18. Each grid electrode 22, as indicated, is positioned above associated cathode lines and insulated therefrom at the areas of intersection (pixels) by the insulator members 20.

A segmented anode structure, which may for example be fabricated by etching a layer of ITO deposited on substrate 14 in accordance with a conventional etching technique, is disposed on substrate 14 and is identified generally by the reference numeral 30. An insulating structure (not shown) maintains the separated substrates and associated cathodes, grid electrodes, and anode segments, and electrophoretic solution 24 containing pigment particles 26 in a single structure. An X-Y Write Control module (not shown), in a writing phase, applies a voltage to selected cathode and grid lines which causes the pigment particles 28 to migrate away from the pixel locations corresponding to intersections of energized grid and cathode lines, thereby darkening those intersections as viewed through glass substrate 12.

The anode structure 30, which represents a novel aspect of the present invention, will now be described. With continuing reference to FIG. 1, it can be seen that anode structure 30 comprises an array of anode segments or character blocks 32, with each respective character block being disposed on the anode substrate or glass substrate opposite corresponding groups of grid and cathode intersections. As will soon be apparent, the thickness of the cathode and grid conductors and the spacing between adjacent conductors, as well as the size of the character to be displayed, determine the nominal dimensions of the character blocks. Typically, each of the row and grid conductors will have a width on the order of 112 μm while separation between adjacent conductors is typically 15 μm. Accordingly, if the display is to utilize characters which are 16 pixels wide and 26 pixels high, then each character block should be 2.017 mm×3.287 mm. As shown in FIG. 1, each character block 32 is isolated from adjacent blocks by a narrow insulating region 34 that is aligned with inactive areas 35 on the cathode and grid lines. It will, therefore, be apparent that the dimensions of these inactive areas will also be a function of the spacing between adjacent cathode and grid conductors, respectively.

With continuing reference to FIG. 1, the anode structure 30 also includes a plurality of row control buses 36 (shown in FIG. 2) and column control buses 38, the former and latter extending perpendicularly relative to one another. As shown more clearly in FIG. 2, the column and row control buses are separated at their points of intersection by layers of insulating material 39. Preferably, column and row control buses 36 and 38 are disposed within insulating regions 34 so that no active area of the display area is lost.

Figure 2:
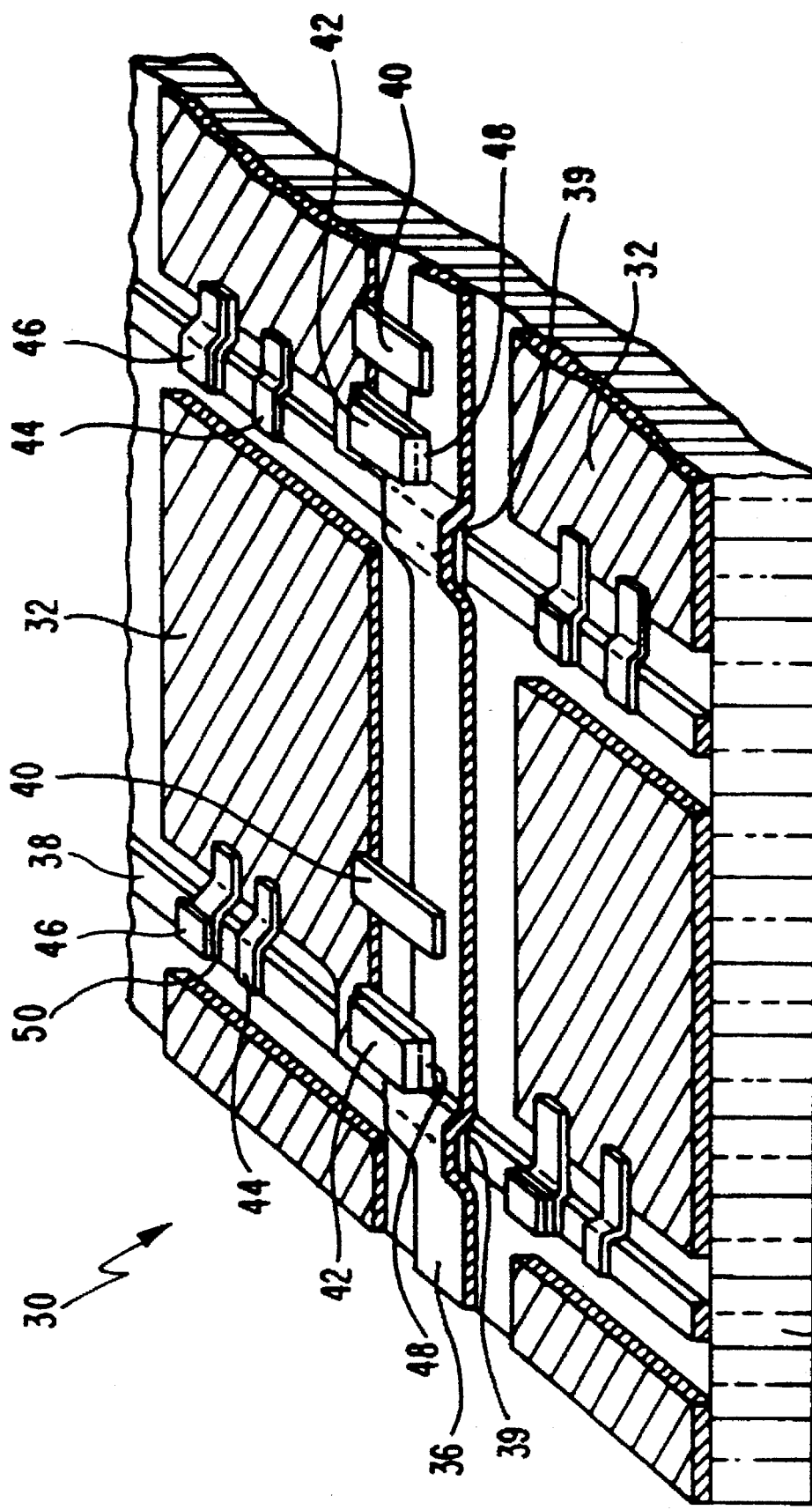
FIG. 2 is a partial perspective view of an electrophoretic display panel substrate provided with an array of character blocks in accordance with the embodiment of FIG. 1.

With continuing reference to FIG. 2, there is shown an array of character blocks 32 disposed on display panel 14. As will be readily appreciated by those of ordinary skill in the art, pixels are erased from a conventional EPID display when the anode plate is at a negative potential relative to the cathode and grid electrode intersections corresponding thereto. This negative bias causes the pigment particles to migrate back toward substrate 12. Accordingly, in order to accomplish the previously noted objective of providing selective character erasure, the present invention provides means for coupling each character block to row and column control buses 36 and 38, which means are selectively operable to apply a negative potential to character blocks corresponding to characters the user desires to erase.

As shown in FIG. 2, each character block 32 is coupled to a row control bus 36 via a first resistor 40 and a first diode 42. Similarly, each character block is coupled to a column control bus 38 via a second resistor 44 and a second diode 46. The electrophoretic solution 24 between the character blocks and cathode and grid structure, which solution typically has a very high resistance, i.e. about $1 \times 10^{10}$ to $1 \times 10^{12}$ $\Omega/cm$, provides the return path for the diode and resistor currents. Preferably, a current limiting resistor 48 is included in series with first diode 42 in order to reduce the power dissipated in first resistor 40 when only one of the control buses coupled to a character block is at a negative potential. For similar purposes, resistor 50 is preferably coupled in series with second diode 46.

The PN junction diodes 42 and 46, as well as resistors 40 and 44, are preferably fabricated monolithically directly on the character blocks in accordance with conventional integrated circuit fabrication techniques. For a detailed description of such techniques as applied to the fabrication of electrophoretic displays, reference may be had to U.S. Pat. No. 4,772,820, entitled Monolithic Flat Panel Display Apparatus and issued to Frank J. DiSanto et al on Sep. 20, 1988, which patent is expressed incorporated herein by reference. The electrical connections between the control buses 36 and 38 and an individual character block 32 are shown schematically in FIG. 3A.

Figure 3A:
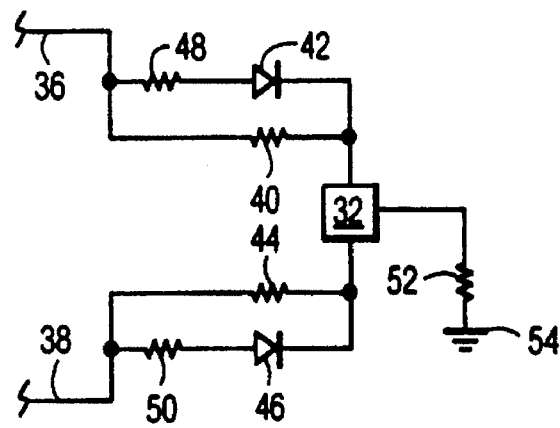
FIG. 3A is a schematic circuit representation of the electrical connections to an individual character block in accordance with the embodiment of FIG. 1.

As shown in FIG. 3A, the resistance of the electrophoretic fluid, designated by reference numeral 52, couples the circuit to ground 54 and thereby provides a return path for the circuit. The resistance values of resistors 40 and 44 are relatively small in comparison to the resistance of the fluid to the cathode/grid. Accordingly, in a typical installation, each of the resistors 40 and 44 may have a resistance value of 10 M $\Omega$ compared to a resistance value of 100 M $\Omega$ or more for the fluid resistance 52. As indicated above, resistors 48 and 50 are provided to reduce the voltage across resistor 40 or resistor 44 when only one of the control buses coupled to character block 32 is at a negative potential. This resistance may be relatively small with respect to resistors 48 and 50, being, for example, on the order of 100 k $\Omega$.

Figure 3B:
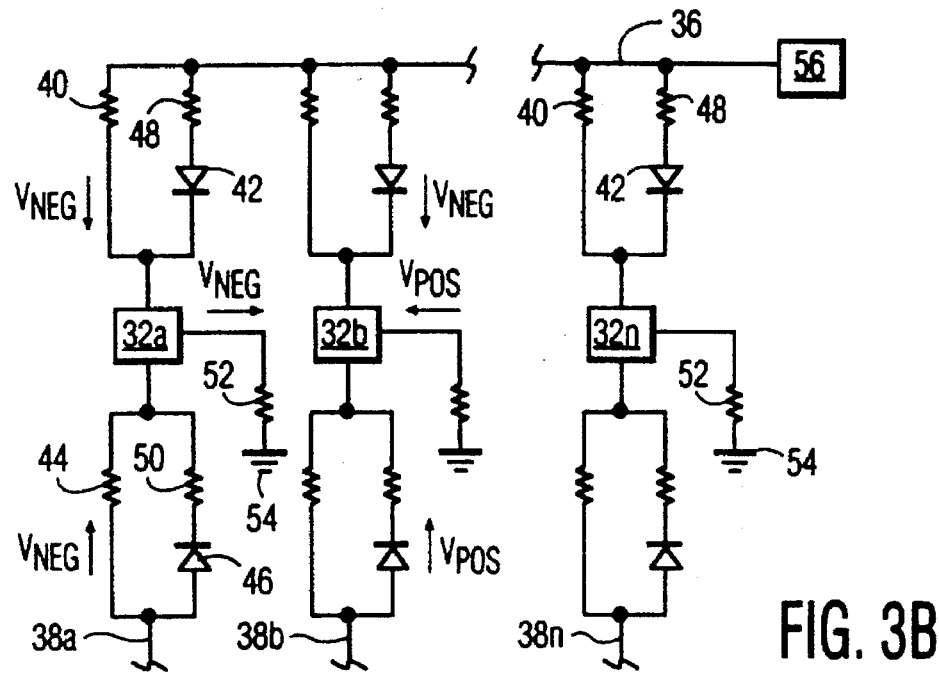
FIG. 3B is a schematic circuit representation illustrating the control of a row of character blocks in accordance with the embodiment of FIG. 1.

With reference now to FIG. 3B, there is shown a schematic representation illustrating the selective control of a row of character blocks 32 designated 32a through 32n coupled to a common row control bus 36 in which only one of the character blocks is selected for erasure. As can be seen, each character block in the row is coupled to a separate column control bus 38a through 38n. In order to erase the pixels associated with character block 32A, a negative potential $V_{neg}$ supplied by a voltage generator 56 is applied via row control bus 36. Similarly, a negative potential $V_{neg}$ is supplied by a suitable voltage generator (not shown) via column control bus 38a. As will be readily apparent to those of ordinary skill in the art, since diodes 42 and 46 are reverse biased and the resistance value of resistors 40 and 44 are low with respect to the electrophoretic fluid resistance 52, the character block 32a is at a negative potential relative to the cathode/grid electrodes. Accordingly, the pigment particles are repelled away from the character block and toward the pixels defined by the grid/cathode intersections adjacent that character block.

With continuing reference to FIG. 3B, it will be seen that other character blocks in the same row as character block 38a need not be erased during the application of a negative potential to row control bus 36 and column control bus 38. With specific reference to character block 32b, it will be observed that if the potential $V_{pos}$ is applied thereto via column control bus 38b, the character block 32b will be biased positive relative to the grid/cathode electrodes associated therewith. Accordingly, the pigment particles will remain adjacent the character block and thus the character of the display associated therewith will remain written. It will therefore be apparent to those of ordinary skill in the art that so long as one of the row or column control buses coupled to a given character block apply a positive potential thereto, that character block will remain at a positive potential. Accordingly, a character of the display associated with such a character block will remain written until both the column and control bus serving that character block are biased negative relative to the cathode/grid.

Figure 3C:
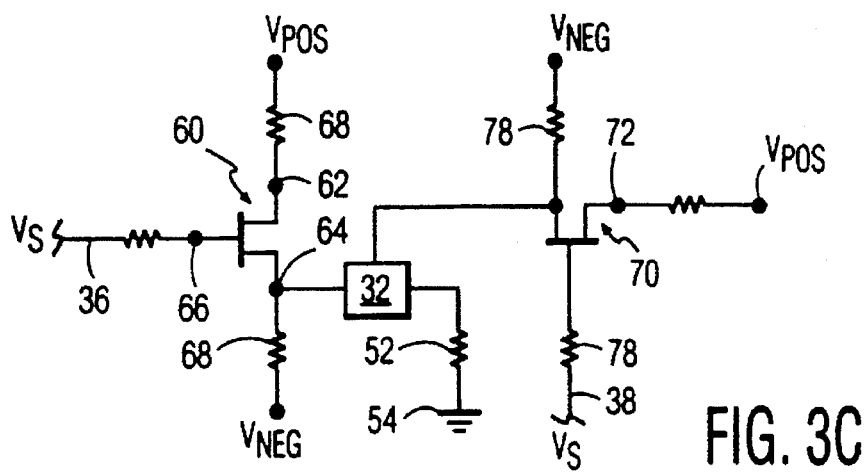
FIG. 3C is a schematic circuit representation of the electrical connections to an individual character block in accordance with another embodiment of the present invention.

With reference now to FIG. 3C, there is illustrated an alternate embodiment in which the passive diode and resistor components described above are replaced with active components, such as MOSFETs or thin-film transistors. As seen in FIG. 3C, transistor 60 is associated with the row control bus 36 while transistor 70 is associated with column control bus 38. A first electrode 62 of transistor 60 is coupled to a source of positive potential $V_{pos}$ while a second electrode 64 of transistor 60 is coupled to a source of negative potential $V_{neg}$. When a small signal voltage $V_s$ is applied via row control bus 36 to the gate 66 of transistor 60, a positive potential is applied to character block. When no signal voltage is present, the gate of transistor 60 remains closed and a negative potential is applied to the character block. The gate 76 of transistor 70, which transistor also includes a first electrode 72 and a second electrode 74, is controlled in a similar manner via column control bus 38. Resistors 68 and 78 are of the same resistance value and, in an identical manner as resistors 40 and 50 of the previous embodiment, are selected to be smaller than the fluid resistance 52. Thus, character block 32 will only operate in an erase mode and hence be at a negative potential if no signal voltage is applied to the gates of transistors 60 and 70.

FIG. 4 is a table which indicates the character block voltage for a 2 by 2 array of character blocks. As seen in the first line of the table, when the voltages on both rows and both columns are positive, the character blocks have a corresponding positive voltage. Line 2 of the table shows that when only the first row has a negative voltage all of the character blocks maintain their positive voltage bias. Similarly, if only column 1 is negative all the character blocks remain positive. However, when both the first column and first row are made negative the character block, i.e. 1.1, which is connect to both the first column and first row is made :negative and erased. All of the remaining character blocks maintain their positive charge. The same principle applies when dealing with a large array such as the 80 column by 25 row array illustrated in FIG. 5.

Figure 5:
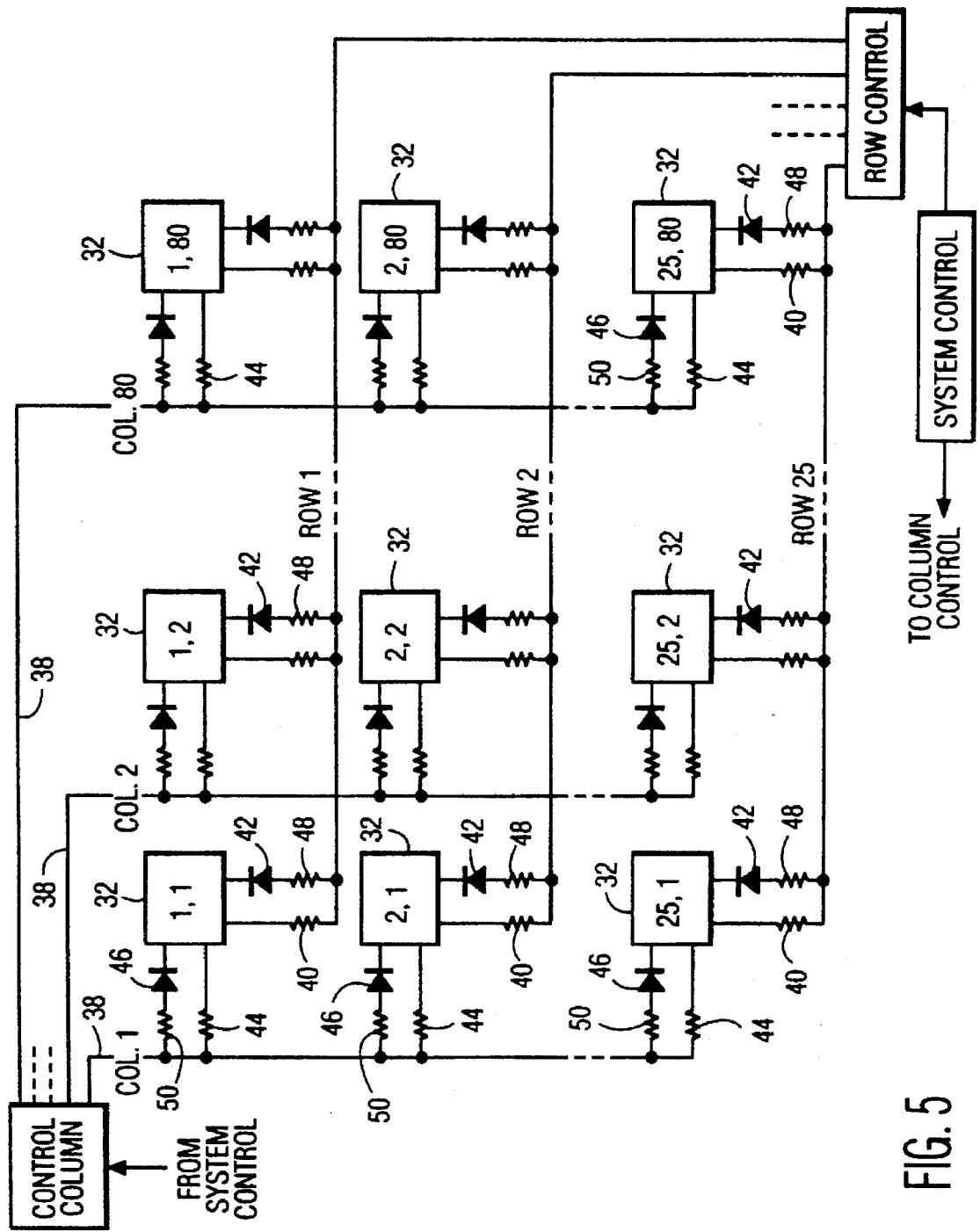
FIG. 5 is a cross-section through the display panel of FIG. 1 pursuant to the present invention.

Referring to FIG. 5, there is schematically shown for illustrative purposes an eighty character by twenty-five line display panel. As will thus be apparent, each line includes 80 character blocks. The character blocks 32, numbered 1, 1 through 25, 80 are interconnected by a plurality of column control buses 38, designated as columns 1 through 80 and a plurality of row control busses 36 designated as rows 1 through 25. The column and row control buses, as described above, are perpendicular to and insulated from each other.

Although the present invention has been described in detail, it should be understood that various changes, substitutions, and alterations can be made herein without departing from the spirit and scope of the invention as defined in the appended claims.

What is claimed is:

1. In an electrophoretic display for displaying characters in a plurality of character positions of a predetermined area, wherein said display includes a cathode structure, a grid structure, an anode structure and an electrophoretic suspension disposed in between said cathode structure and said anode structure, an improved anode structure comprising:

a substrate;

a plurality of conductive character blocks disposed on said substrate to lie in a single plane and arranged in a matrix containing columns and rows, each of said character blocks being a single unitary solid layer of conductive material of said predetermined area, wherein each of said character blocks is separated from each other on said substrate by column spaces and row spaces that define said predetermined area of each of said character blocks, and wherein each of said character blocks corresponds in position to one of the character positions in said display;

row control lines disposed on said substrate in each of said row spaces, wherein a single row control line is coupled to each of said character blocks in a common row in said matrix;

column control lines disposed on said substrate in each of said column spaces, wherein a single column control line is coupled to each of said character blocks in a common column in said matrix, and;

means for selectively applying voltage to one said row control line and one said column control line to selectively change the voltage of one of said conductive character blocks in said matrix.

2. An anode structure as defined in claim 1, further including a first resistor and a first diode connecting each of said character blocks to a corresponding column control line and, a second resistor and a second diode connecting each of said character blocks to a corresponding row column line.

3. An anode structure as defined in claim 2, wherein said first resistor and said first diode are arranged in parallel and said second resistor and said second diode are arranged in parallel.

4. An anode structure as defined in claim 3, further including a first current limiting resistor arranged in series with said first diode and a second current limiting resistor arranged in series with said second diode.

5. An anode structure as defined in claim 1, wherein each of said character blocks is approximately 16 pixels wide and 26 pixels high.

6. An anode structure as defined in claim 4, wherein said first current limiting resistor and said first diode are monolithically formed and said second current limiting resistor and said second diode are monolithically formed on said anode structure.

7. An anode structure as defined in claim 2, wherein said electrophoretic suspension has a predetermined resistance and said first resistor and said second resistor have a resistance less than said predetermined resistance.

8. An anode structure as defined in claim 1, further including a first MOSFET connecting each of said character blocks to a corresponding row control line and a second MOSFET connecting each of said character blocks to a corresponding column control line.

9. An anode structure as defined in claim 1, further including a first thin-film transistor connecting each of said character blocks to a corresponding row control line and a second thin-film transistor connecting each of said character blocks to a corresponding column control line.

10. An anode structure as defined in claim 1, wherein said means for selectively applying voltage to one said row control line and one said column control line applies a negative voltage for erasing one of said conductive character blocks in said matrix.

11. A method for selectively addressing character positions of a predetermined size on an electrophoretic display having a cathode structure and a grid structure, comprising the steps of:

providing an anode having a plurality of conductive character blocks arranged to lie in a single plane in a matrix containing columns and rows, each of said character blocks being a single unitary solid layer of conductive material of said predetermined size, wherein each of said character blocks are separate from each other and each of said character blocks correspond in size and location to one of the character positions on the display;

interconnecting each of said character blocks in a row of said matrix with a single row control line and interconnecting each of said character blocks in a column of said matrix with a single column control line; and selectively erasing a selected character block in said matrix by applying a negative voltage to said row control line and said column control line that intersect at the selected character block.

12. A method as defined in claim 11, wherein said step of applying a negative voltage includes applying a negative voltage to more than one column control line to address more than one character block.

13. A method as defined in claim 11, wherein said step of interconnecting includes the substeps of;

connecting each of the character blocks to said row control line by a first resistor and, parallel to said first resistor, a series connected diode and second resistor, and connecting each of the character blocks to said column control line by a third resistor and, parallel thereto, a series connected diode and fourth resistor.

14. A method as defined in claim 11, wherein said steps of interconnecting includes connecting each of the character blocks to a corresponding row control line and a corresponding column control line using active electronic components.

15. A method as defined in claim 14, wherein the character blocks are connected to row control lines and column control lines by thin-film transistors.

16. An electrophoretic display, comprising:

anode having a plurality of separate character blocks arranged to lie in a single plane in a matrix having columns and rows, each of said, character blocks being a single unitary solid layer of conductive material deposited on a substrate, wherein each of said character blocks is of a predetermined area that is large enough to contain the largest sized character capable of being displayed on said electrophoretic display;

a plurality of parallel row control lines arranged in between said rows of said matrix, wherein each of said character blocks in said matrix is coupled to a single common row control line;

a plurality of parallel column control lines perpendicular to said row control lines and arranged between said columns of said matrix, wherein each of said character blocks in each of said columns in said matrix is coupled to a single common column control line;

a plurality of parallel cathode lines;

a plurality of parallel grid lines perpendicular to said cathode lines and insulated therefrom so as to form an X-Y matrix, said X-Y matrix of cathode and grid lines being arranged at a distance from said anode;

an electrophoretic dispersion of particles in a suspension medium arranged between said anode and said X-Y matrix;

means for controlling and applying voltage to selected cathode and grid lines of the X-Y matrix so as to cause the particles in the suspension medium to migrate toward the anode to write in the character blocks;

means for selectively applying voltage to said row and column lines to write and erase individual character blocks, said voltage applying means applying a voltage to a row and column line corresponding to the character block to be erased so that the particles in the suspension medium between said selected plurality of cathode and grid lines and one of said conductive character blocks are caused to migrate away from the anode toward the X-Y matrix; and means for integrally controlling said means for applying voltage to said X-Y matrix and said means for applying voltage to said row and column control lines.

* * * * *